July 28, 1964
M. B. PEARLMAN
3,142,150
DEVICES FOR USE IN THE TREATMENT OF EXHAUST GASES OF
INTERNAL COMBUSTION ENGINES
Filed Sept. 18, 1961
2 Sheets-Sheet 1
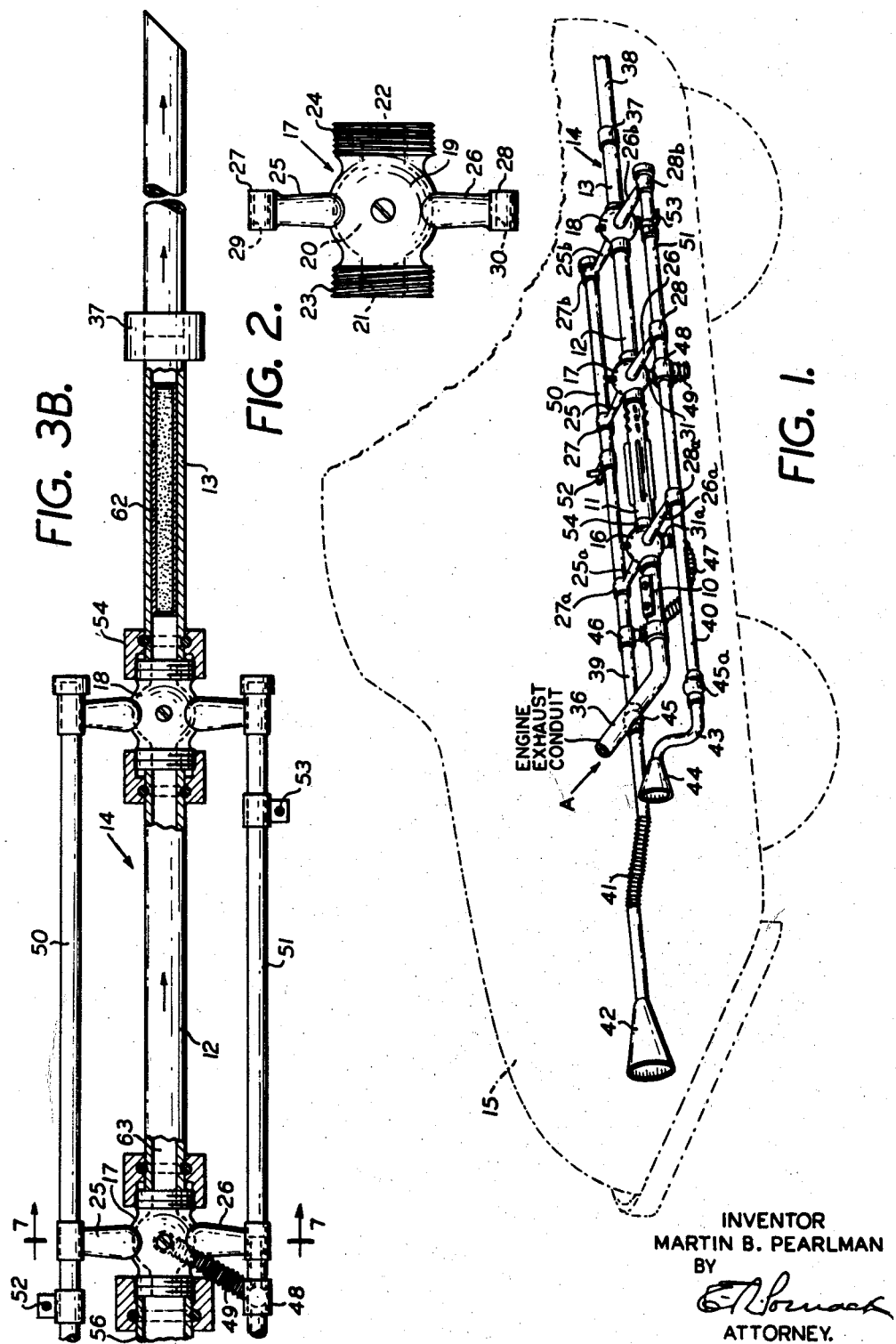
INVENTOR
MARTIN B. PEARLMAN
BY
ATTORNEY.

July 28, 1964   M. B. PEARLMAN   3,142,150
DEVICES FOR USE IN THE TREATMENT OF EXHAUST GASES OF
INTERNAL COMBUSTION ENGINES
Filed Sept. 18, 1961   2 Sheets-Sheet 2
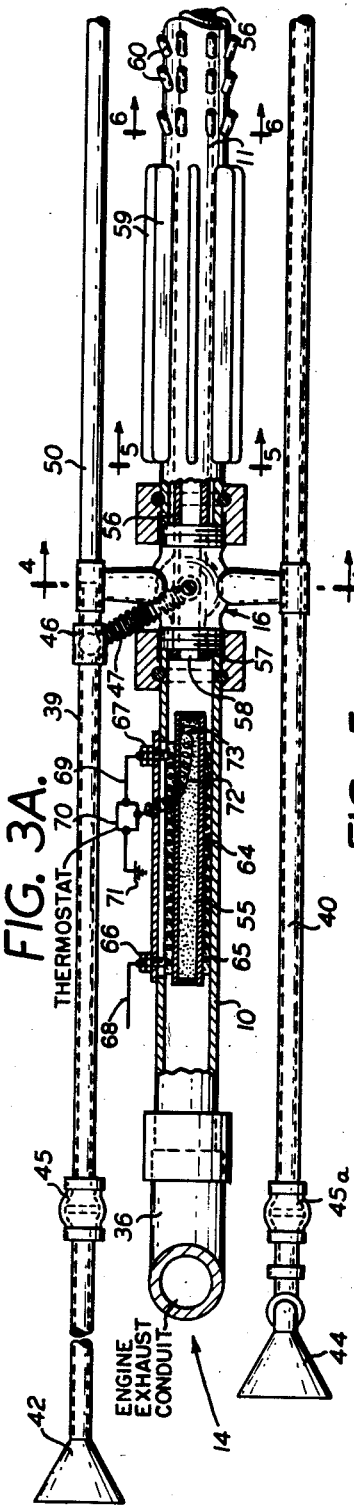
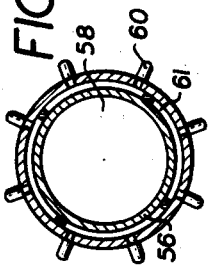
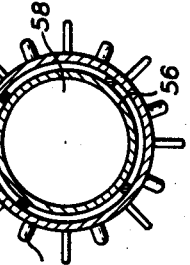
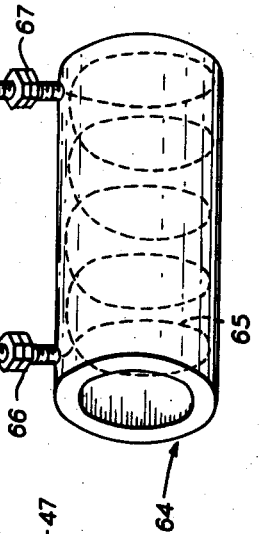
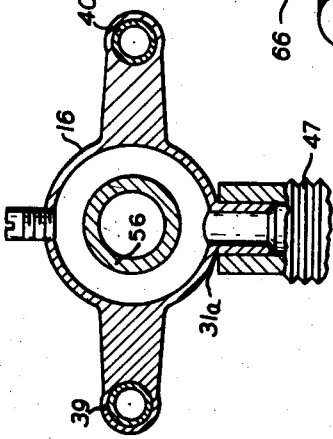
INVENTOR
MARTIN B. PEARLMAN
BY
ATTORNEY.

United States Patent Office 3,142,150
Patented July 28, 1964

3,142,150
DEVICES FOR USE IN THE TREATMENT OF EXHAUST GASES OF INTERNAL COMBUSTION ENGINES
Martin B. Pearlman, 78—05 141st St., Flushing 67, N.Y.
Filed Sept. 18, 1961, Ser. No. 138,704
4 Claims. (Cl. 60—30)

This invention relates to devices for use in the treatment of exhaust gases of internal combustion engines, and is particularly directed to a device adapted for attachment to an automobile for cooperative use with smog-eliminating apparatus.

The automobile's contribution to air pollution is, to a large extent, caused by the presence in the exhaust gases (1) of such unburnt gases as hydrocarbons and carbon monoxide, (2) of nitrogen oxides, and (3) of particles of lead—the latter not only contaminating the atmosphere but also tending to cause damage to catalysts or certain components of the exhaust conduit. Three of the major problems in the solution of the problem of eliminating the smog-producing action of automobiles are accordingly the effective oxidation of said unburnt gases, the reduction or deoxidation of the oxides of nitrogen present in the fume stream, and the physical elimination of said particles of lead.

To effect the oxidation of hydrocarbons at relatively low temperatures—below the flammable range—it has been proposed to use catalysts, whereby oxygen will be caused to be combined with the unburnt gases to produce carbon dioxide and water at a temperature range of 450°–600° F. With this objective in view, special catalytic devices have been interposed in the path of the exhaust gases to eliminate, through oxidation, the smog-producing concentrations of hydrocarbons, carbon monoxide, etc. To effect the removal of the nitrogen oxides present in the exhaust stream—at low temperatures suitable for internal combustion engines in automobiles—it has been proposed to use a suitable catalyst in the fume stream (containing unburnt hydrocarbons) thereby to produce an odorless and harmless mixture comprising carbon dioxide, water vapor and nitrogen. It has been found that the amount of free oxygen contained in the fume stream influences the ease with which the reaction is completed.

Both of the above-mentioned catalytic methods require the use of air for most effective results, and both require different temperature conditions for optimum results. It is an important objective of my invention to provide a unitary device for enabling both methods to be employed. And in this aspect of my invention it is a further object to provide means for operatively supporting catalysts at different points in the fume stream, supplying relatively fresh air in proximity to such points, and operatively cooling the stream so that the catalyst or catalysts operatively supported by my device will effectively promote the required reaction.

Another object of this invention is to provide, within the said unit, special spaced sections for receiving the air introduced by the air supply lines of my device, and which also serve as traps for particles of lead and other solids that may be present in the fume stream, such traps containing means to enable them to be readily cleaned.

It is my further object to supply the required air for my system from regions under the hood of the car, without the use of any special blowers. And it is within the contemplation of this aspect of my invention to provide conveniently positioned conduits for supplying such air to the stream of exhaust gases for direct mixture therewith, for the promotion of the aforesaid catalytic reactions, or for the direct oxidation of the unburnt gases in suitably positioned after-burners.

It has been found that during the initial starting period of an internal combustion engine, while an operatively positioned catalyst and the surrounding region are still cool, the catalytic reaction does not begin until the temperature has been raised to an operative level. In such cases there is the danger of the creation of a smog-producing effluent during starting periods, despite the presence of a catalytic agent. It is accordingly another objective of my invention to eliminate this shortcoming by providing, within the same unitary structure, effective preheating means operative only during the starting period of the engine, thereby to bring the catalytic region, during such period, up to an effective temperature.

It is my objective to provide a simple, inexpensive and readily installed device having the features above mentioned.

Other objects, features and advantages will appear from the drawings and the description hereinafter given.

Referring to the drawings,

FIG. 1 is a perspective view showing one form of my invention operatively applied to a motor vehicle.

FIG. 2 is a top view of one of the globular chambers interposed within the exhaust gas conduit of the device shown in FIG. 1 and serving as combination air inlet and particle trap members.

FIG. 3A is a top view of the forward portion of the device of my invention, a fragment being sectioned for clarity.

FIG. 3B is a top view of the rear portion of the said device, the portion thereof shown in this figure being continuous with that of FIG. 3A, portions being sectioned for clarity.

FIG. 4 is an enlarged fragmentary section of FIG. 3A taken along line 4—4.

FIG. 5 is an enlarged section of FIG. 3A taken along line 5—5.

FIG. 6 is an enlarged section of FIG. 3A taken along line 6—6.

FIG. 7 is an enlarged fragmentary section of FIG. 3B taken along line 7—7.

FIG. 8 is a perspective view of the heating member shown in the forward part of the exhaust gas conduit of FIG. 3A.

The particular form of my invention illustrated constitutes a four-stage apparatus embodying the catalytic treating section 10, the cooling section 11, the mixing section 12 and another catalytic treating section 13, these being parts of an exhaust gas conduit generally designated 14, as will more clearly be hereinafter set forth. Although the embodiment shown comprises four stages, it is to be understood that the invention contemplates a lesser or greater number of stages, depending upon the gas treating means selected for the particular installation to which my invention is to be applied. In the installation disclosed in FIG. 1, the forward portion of my device is disposed under the hood generally designated 15 of an automobile, there being operatively disposed therein an internal combustion engine having a conventional exhaust manifold not shown, but well-known to those skilled in the art.

Interposed between sections 10 and 11 is the first air inlet and particle trap chamber member 16, a second similar member 17 being interposed between sections 11 and 12 and a third similar member 18 being interposed between sections 12 and 13. Said chamber members are all substantially similar to member 17 shown in FIG. 2, each of said members comprising a hollow substantially globular portion 19 having the central chamber 20 communicating with the respective forwardly and rearwardly disposed passageways 21 and 22, the forward and rearward portions being externally threaded at 23 and 24 for receiving thereover suitable pipe fittings. Extending laterally outwardly in opposite directions from the wall of said central portion 19 of member 17 are the two arms 25 and 26, these having at their respective terminals pipe supporting portions 27 and 28 each containing therein the longitudinally extending passageways 29 and 30, respectively. The lower portion of each of said chamber members has a hollow extension, such as the extension 31 of member 17, adapted to serve as a pipe-receiving fitting, the bottom end 32 thereof being open, as clearly shown in FIG. 7. At the top of said chamber member 17, and diametrically opposite the passageway 33 of said extension 31, is the threaded apertured portion 34 adapted to receive therein the externally threaded plug 35.

The forward portion of said conduit member 14 has the pipe 36 operatively connected to the exhaust manifold, whereby the gases from said manifold will enter said pipe 36 in the direction indicated by arrow A. At the rear end of said conduit member 14 is a coupling 37 connecting the conduit to the pipe 38 which is connected to the muffler or tail pipe of the vehicle. Flanking said conduit 14 are the air supply pipes 39 and 40, the former being operatively connected through the flexible pipe 41 to the air scoop member 42, and the latter being operatively connected to the pipe 43 carrying the air scoop 44. In the preferred construction illustrated, there are check valves 45 and 45a to permit only a rearward flow of air therethrough. It is preferred, though not required, that one of the said air scoops, such as 42, be disposed at the forward portion of the hood, and that the other scoop, such as 44, disposed rearwardly therefrom. It is understood, however, that these air scoops may be positioned at any selected portion of the vehicle for the purpose of receiving fresh air and supplying same to the conduit 14, in the manner hereinbelow described. The said flexible hose 41 permits scoop 42 and associated parts to be positioned clear of engine parts, and in a suitable position for optimum functioning.

Connected to said pipe 39 is a T or other suitable pipe fitting 46 to which is connected the flexible air supply hose 47, the latter being operatively connected to the extension 31a of the chamber member 16. The said pipe 40 has at the rearward portion thereof the pipe fitting 48 connected to the flexible air supply hose 49 which is attached to said extension 31 of the chamber member 17. Extending rearwardly from pipe connection 45 is the supporting rod 50; and extending rearwardly from fitting 48 is the supporting rod 51, said rods being connected by members 52 and 53 to the chassis in any suitable manner, whereby said rods 50 and 51 and their associated parts are operatively supported in substantially fixed relation to the chassis. In the embodiment shown, the said rod 50 extends through the passageways of terminal portions 27a, 27 and 27b of the respective arms 25a, 25 and 25b of the said chamber members 16, 17 and 18, respectively; and said pipe 40 extends through the passageway of the terminal portion 28a of the arm 26a of chamber member 16, the rod 51 extending through the respective passageways of terminals 28 and 28b of the arms 26 and 26b of the respective chamber members 17 and 18. The said sections 10, 11, 12 and 13 are provided with swivel couplings generally designated 54, of known construction, these couplings being in threaded engagement with the said forwardly and rearwardly disposed threaded extensions 23 and 24 of the said respective chamber members. The arrangement is such that said couplings 54, in operatively connecting the said chamber members with the said sections of the conduit member 14, enable a continuous passageway for gases to be provided from the exhaust manifold through the conduit 14. Inasmuch as the said rods 50 and 51 are operatively supported, in the manner aforesaid, by the chassis, it is evident that the entire structure is operatively supported in place underneath the chassis with the forward portions operatively disposed underneath the hood.

Disposed within section 10 is the catalyst generally designated 55, said catalyst being of a type selected for effecting a purifying action on the gases from the exhaust manifold. For example, catalyst 55 may be suitable to effect the removal of any nitrogen oxides that may be present in the exhaust stream. Section 11 of said conduit 14 contains therein a suitably supported tube 56, said tube extending from the forward end of said chamber member 16 (see FIG. 3A) rearwardly to the forward side of chamber member 17 (see FIG. 3B). The forward terminal of said tube 56 contains the flange 57, sealing the annular air passageway 61 in section 11, thereby permitting the flow of gases from section 10 only through the central passageway 58 of said tube. Extending radially from said section 11 are the radiating fins 59; and disposed rearwardly from said fins are the outlet jets 60 communicating with said annular air passageway 61 (see FIGS. 3A, 5 and 6). Section 12 of the conduit 14 comprises a hollow tube communicating between the interiors of chamber members 17 and 18. And section 13 of said conduit contains therein another catalytic member 62 of a type selected for effecting a further purification of the exhaust gases, such as the catalyst adapted to oxidize hydrocarbons, or to effect an oxidation of carbon monoxide under relatively low temperature conditions.

In the operation of this apparatus, the movement of the car, or the operation of the fan connected to the engine, causes fresh air to enter the said scoops 42 and 44. Air from scoop 42 is directed into chamber member 16, whereafter it continues to move rearwardly through the said passageway 61 of section 11, thereby cooling the exhaust gases operatively passing through the passageway 58 of the tube 56. The fins 59 convey the absorbed heat outwardly into the atmosphere, the heated air leaving the annular passageway 61 through the said jets 60. The gases from the exhaust manifold are operatively treated by the catalyzer 55, the latter being supported by section 10 of the conduit member 14. The purified gases leaving the catalyzer 55, pass through the passageway 58 as aforesaid, being cooled until they reach the interior of chamber member 17. At this point the air from scoop 44 is injected into the stream of the cooled gases, through the flexible hose 49, whereafter the mixed gases pass through passageway 63 of section 12 to enter the interior of chamber member 18 and then pass through the said catalyzer 62 supported within section 13 for further purification prior to being discharged into the atmosphere. It will be noted that since the fume stream entering section 13 has been cooled and mixed with a fresh supply of air, it will be particularly suited for carbon monoxide catalytic oxidation, since such oxidation can effectively occur at relatively low temperatures in the presence of excess air. It is, of course, understood that other catalysts may be employed in different sections of the conduit for effecting catalytic purification in various stages as may be suitable for a particular case.

It will be noted that in section 10 there is a heating member generally designated 64 containing a heating coil 65 (see FIGS. 3A and 8) connected to terminals 66 and 67. Terminal 66 is operatively connected, by conductor 68, to the ignition system of the engine (not shown); and terminal 67 is operatively connected by conductor 69 to the thermostat 70 which is grounded at 71. The thermostat is operatively connected by conductor 72 to a suitable sensing element 73 positioned within the catalyzer 55. The thermostat 70 is set so that when the sensing element 73 is below a certain predetermined temperature, the circuit through the heating element 65 will be closed, the circuit being opened when a certain higher predetermined temperature is obtained. The operation of such a thermostatic switch is well-known to those skilled in the art, and need not be described for the purpose of this specification. Suffice it to say that it is set so that at the starting of the engine, before the exhaust gases will have had the opportunity to have heated up the catalyst 55, the ignition-heating element circuit, being closed by the thermostat 70 at said low temperatures, will cause the heating element 65 to be heated, thereby raising the temperature of the catalyst 55. Since most catalysts for exhaust gas purification purposes are not effective at low temperatures, the raising of the temperature will activate it, thereby eliminating the danger of initial discharges of untreated gas. When the predetermined higher temperature is reached, the thermostat 70 opens the circuit, the catalyst being maintained at the required operative temperature by the heat in the exhaust gases passing therethrough.

During the passage of the fume stream from section 10 to section 13, the gases are required to pass through the said chamber members 16, 17 and 18. Since the interiors of members 17 and 18 are unobstructed (only member 16 having a tube therein) and are of expanded proportions, the gases entering such chambers are caused momentarily to expand and then move rearwardly through the successive portions of the conduit. It has been found that solid matter, such as particles of lead which are present in the stream, drop gravitationally to the bottom of said chambers. The effluent gases are thus not only purified by catalytic action, but also by the physical removal of harmful lead and other solid particles present in the fume stream. The construction of the chamber members is such as to enable such accumulations of solid particles readily to be removed. Thus, in member 17, this is effected by removing the flexible hose member 49 from extension 31, and removing the plug 35, whereupon any accumulations of soot can readily be blown out through said passage 33.

It is thus apparent that my invention comprises a unitary member adapted readily to be attached to a car, and arranged operatively to accommodate suitable catalytic members, and having heating, cooling, mixing and particle-removing means, whereby a complete conversion of exhaust gases can be effected for correcting, by known means, air pollution conditions resulting from automobile exhausts.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:
1. In a system for use in the treatment of exhaust gases of an internal combustion engine having an exhaust manifold, the combination of an exhaust gas conduit operatively connected to said manifold, a plurality of longitudinally aligned gas treating sections in communication with said conduit, a plurality of casings disposed between adjacent sections, each of said casings having a body portion with a central chamber therein and coupling means at opposite ends of said chamber, each of said coupling means being in operative engagement with the adjacent section, at least one of said casings having an air-inlet portion in its respective body portion in communication with its chamber, each of said casings having a plurality of arms extending from the body portion thereof and having outer terminals with pipe supporting means, and air supply pipes operatively supported by said pipe supporting means, and conduit means connecting said pipes with said air-inlet portion.

2. A system for treating exhaust gases as in claim 1 in which the chambers in said casings are of a globular configuration.

3. A system for treating exhaust gases as in claim 2 in which said conduit extends in gas carrying relationship through one of said casings.

4. A system for treating exhaust gases as in claim 1 in which one of said casings is formed with cooling fins.

References Cited in the file of this patent
UNITED STATES PATENTS

| | | |
|---|---|---|
| 1,109,547 | Robinson | Sept. 1, 1914 |
| 1,605,484 | Thompson et al. | Nov. 2, 1926 |
| 1,716,480 | Bilsky | June 11, 1929 |
| 1,756,897 | Bilsky | Apr. 29, 1930 |
| 1,771,439 | Hyatt | July 29, 1930 |
| 1,789,812 | Frazer | Jan. 20, 1931 |
| 1,843,999 | White | Feb. 9, 1932 |
| 1,847,506 | White | Mar. 1, 1932 |
| 1,856,005 | Tomshow | Apr. 26, 1932 |
| 1,902,160 | Frazer et al. | Mar. 21, 1933 |
| 2,162,683 | Tobin | June 13, 1939 |
| 2,308,059 | Decker | Jan. 12, 1943 |
| 2,325,543 | Redinger | July 27, 1943 |
| 2,488,563 | Sills | Nov. 22, 1949 |
| 2,880,079 | Cornelius | Mar. 31, 1959 |
| 2,943,592 | Benson et al. | July 5, 1960 |
| 2,956,865 | Williams | Oct. 18, 1960 |

FOREIGN PATENTS

| | | |
|---|---|---|
| 14,923 | Great Britain | June 26, 1909 |
| 413,967 | Great Britain | July 26, 1934 |